Figure 1:
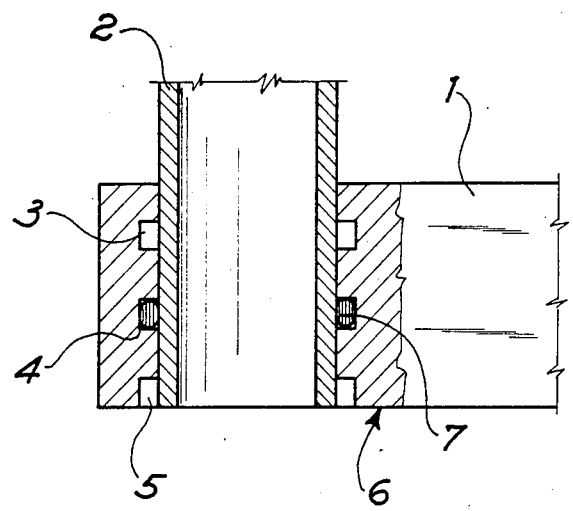

United States Patent [19]

Daua Bona

[11] Patent Number: 4,667,989
[45] Date of Patent: May 26, 1987

[54] LEAK-FREE AND VIBRATION RESISTANT PIPE-FLANGE COUPLING

[75] Inventor: Alfredo Daua Bona, Abbiategrasso, Italy

[73] Assignee: Murray Europe S.p.A., Cusago, Italy

[21] Appl. No.: 873,204

[22] Filed: Jun. 11, 1986

[30] Foreign Application Priority Data

Jan. 17, 1986 [IT] Italy .............................. 20521/86[U]

[51] Int. Cl.⁴ ............................................. F16L 13/14
[52] U.S. Cl. .................................. 285/382.4; 285/405; 285/422
[58] Field of Search .................. 285/382.4, 382.5, 422, 285/405

[56] References Cited

U.S. PATENT DOCUMENTS

| 332,035 | 12/1885 | Bagaley | 285/382.4 X |
| 786,551 | 4/1905 | Doolittle | 285/382.5 X |
| 4,330,144 | 5/1982 | Ridenour | 285/382.5 |

Primary Examiner—Dave W. Arola
Attorney, Agent, or Firm—Bucknam and Archer

[57] ABSTRACT

The pipe (2) is inserted in the flange hole (1) and the pipe-flange seal is assured by an elastomeric ring (7), compressed inside a circular groove (4), made along the internal surface of the flange hole and by heading and expansion of the pipe inside the said hole. The internal surface of the hole may have another two circular grooves, positioned up-stream and down-stream of the first groove (4): one (3) being closed and the other (5) open on one face (6) of the flange. During heading the pipe (2) expands into the groove (3) and folds along the edge of the open groove (5).

1 Claim, 2 Drawing Figures

LEAK-FREE AND VIBRATION RESISTANT PIPE-FLANGE COUPLING

BACKGROUND OF THE INVENTION

1. Field of the Invention

This invention refers to a leak-free and vibration resistant pipe-flange coupling.

More specifically, this invention refers to a leak-free and vibration resistant pipe-flange coupling, particularly suited to being used in pressurised fluid circuits that are also subject to vibrations, as for example in air conditioners and compressors mounted on vehicles.

In pipe-flange couplings which are required to maintain a stable, leak-free condition in time and withstand vibrations at any frequency, as occurs for example in the compressor circuits of car air conditioners, the present state of the art foresees that the components be welded.

This welding operation, particularly in the case of aluminium, or light alloy cast pipes, involves considerable problems in executing the weld and significant difficulties to ensure that a reliable coupling is achieved.

The main drawbacks are: sagging and burrs on the sealing surface; burning, or porosity in the weld caused by the use of deoxidisers; annealing of the base materials with a weakening of the structural rigidity and the toughness of the materials themselves, etc. In addition, during operation, the inevitable prolonged stress, as a consequence of the vibrations may crack a layer of melted material, breaking the seal.

This invention solves the problem of making the leak-free and vibration resistant coupling between the pipe and flange, without the difficulties and drawbacks of welding and the uncertainties of a screwed coupling.

According to this invention the pipe is inserted inside a hole in the flange and the coupling and the seal between the pipe and flange is ensured by a ring of elastomeric material, compressed and blocked in a groove made on the internal surface of the hole and by heading and expanding the pipe inside the flange hole.

Figure 2:
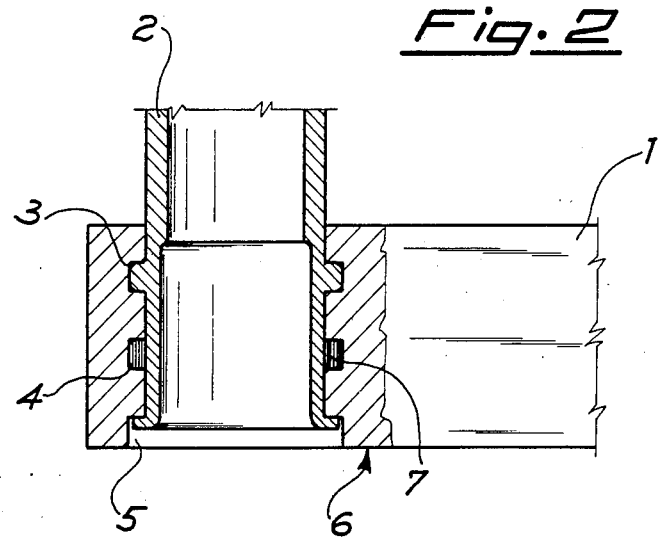

This invention may be understood better from the following detailed description, where reference is made to the figures of the attached drawing which represent a preferred, illustrative, but non-limitative embodiment and where:

FIG. 1 is a the schematic view of the longitudinal cross section of the pipe-flange coupling, according to this invention, before heading; and FIG. 2 represents the same view of FIG. 1 after heading.

The figures illustrate a general flange 1 with an assembly hole for a pipe 2 and sectioned along the centre-line of the hole.

The flange 1 is preferably of light alloy, or aluminium, the pipe 2 is of drawn aluminium.

Two closed circular grooves 3 and 4 and one open circular groove 5 are made on the inside surface of the hole; the latter groove is made in correspondence to one end 6 of the flange, which corresponds to the seal end.

A ring gasket 7 of elastomeric material is housed in the intermediate closed groove 4, afterwhich the pipe 2 is fitted, to be made leak-free with a peripherical seal until it faces the sealing surface 6.

The pipe end is headed, while it is on the flange arranged as above, as shown in FIG. 2, using a heading punch and expansion, a technique known as such.

The pipe is partially headed and completely occupies the first closed groove 3, compressing the ring fully filling, under load, the second closed groove 4 and finally turning over into the open groove 5. Thus, an unmovable coupling of the pipe inside the flange is obtained due to the mutual restraints and a perfect seal by the compressed elastomer ring.

What I claim is:

1. A leak free and vibration resistant pipe-flange coupling which consists of a flange (1) made of aluminum having an opening and a pipe (2) made of aluminum inserted and fixed within said opening, said flange having in the inner surface of said opening, three circular grooves, (3, 4 and 5) groove (3) being upstream of said groove (4) and groove (5) being downstream of said groove (4), a ring of elastomeric material (7) being compressed in said groove (4) by said pipe, said groove (3) being closed by side pipe and said groove (5) being open, said groove (5) being arranged at end (6) of said flange (1) opposite the end where the pipe is introduced into the opening, said pipe material (2) being expanded into said closed groove (3), the edge of the said pipe being bent over and turned into said groove (5).

* * * * *